US010135964B2

(12) United States Patent
Nuescheler et al.

(10) Patent No.: US 10,135,964 B2
(45) Date of Patent: Nov. 20, 2018

(54) TOUCH AND DEVICE ORIENTATION-BASED DEVICE PAIRING

(71) Applicant: ADOBE SYSTEMS INCORPORATED, San Jose, CA (US)

(72) Inventors: David Nuescheler, Salt Lake City, UT (US); Tobias Bocanegra, Tokyo (JP); Alexandre Capt, Landser (FR)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/243,074

(22) Filed: Aug. 22, 2016

(65) Prior Publication Data
US 2018/0054509 A1 Feb. 22, 2018

(51) Int. Cl.
H04M 1/725 (2006.01)
H04W 76/14 (2018.01)
H04W 4/80 (2018.01)

(52) U.S. Cl.
CPC ..... *H04M 1/7253* (2013.01); *H04M 1/72569* (2013.01); *H04W 4/80* (2018.02); *H04W 76/14* (2018.02)

(58) Field of Classification Search
CPC ..... H04W 4/008; H04W 4/027; H04W 12/00; H04W 12/04; G06F 3/017
USPC ............ 455/41.2–41.3, 67.11, 566
See application file for complete search history.

(56) References Cited

U.S. PATENT DOCUMENTS

| 2010/0167646 | A1* | 7/2010 | Alameh | G06F 3/017 455/41.2 |
| 2012/0040719 | A1* | 2/2012 | Lee | G06F 1/1626 455/557 |
| 2013/0065517 | A1* | 3/2013 | Svensson | H04W 12/00 455/39 |
| 2014/0160033 | A1* | 6/2014 | Brikman | G06F 3/04845 345/173 |
| 2014/0206288 | A1* | 7/2014 | Liu | H04W 12/04 455/41.2 |
| 2014/0282068 | A1* | 9/2014 | Levkovitz | G06Q 20/223 715/748 |
| 2015/0181634 | A1* | 6/2015 | Cheng | H04W 4/008 455/426.1 |
| 2016/0344712 | A1* | 11/2016 | Ding | G06F 21/44 |

* cited by examiner

*Primary Examiner* — Simon Nguyen
(74) *Attorney, Agent, or Firm* — Brake Hughes Bellermann LLP

(57) ABSTRACT

Systems and methods are provided for pairing a mobile device with a second device based on the mobile device being placed flat against a touch screen of the second device. The mobile device determines that is has been placed in a predetermined orientation that matches the orientation of the display of the second device. The second device detects the contact of the mobile device with its touch screen. Both devices send timestamps of their respective determinations to a server that compares the timestamps. If the timestamps match within a predetermined threshold, the server initiates pairing of the devices.

14 Claims, 7 Drawing Sheets

TOUCH AND DEVICE ORIENTATION-BASED DEVICE PAIRING

TECHNICAL FIELD

The technology of this disclosure relates generally to pairing processor-based mobile devices with other processor-based devices, such as touch screen devices that are located in stores and other public locations.

BACKGROUND

Touch screen devices, such as directories in many stores, airports, and other public locations, enhance the on-location experiences of consumers, travelers, and other users. Such devices provide users with the ability to view facility layouts, search for particular departments and products while in a store, access transit schedules and maps in transit stations, ask questions, and find in-person assistance, among many other uses. The on-location touch-screen devices can provide enhanced user experiences in circumstances in which the user's identity and/or other information is provided to the touch screen by pairing the user's mobile device to the touch screen. Conventionally the pairing process involves one or more of Quick Response ("QR") Code scanners, personal identification number ("PIN") entries, iBeacons, near field communications ("NFC"), push messages, etc. However, such conventional methods require specific, complex, wireless networking capabilities on the mobile device (e.g. bluetooth, NFC, wifi, etc). In addition, the pairing processes generally require an undesirable amount of tedious manual operation (e.g. QR-code scanning, pairing PIN entry, etc.) and are often not intuitive to unsophisticated users. Conventional methods of pairing thus fail to make pairing with on-location touch-screen devices simple, intuitive, and quick enough to satisfy most users' expectations.

SUMMARY

Systems and methods for pairing a mobile device to another device based on an orientation of the mobile device in relation to an orientation of the other device are disclosed. One or more embodiments involve(s) pairing a mobile device with a second device. The second device has a display and is capable of detecting a physical contact with the display (or with some other portion of the second device). When the second device detects a physical contact, the second device notifies a server that it has detected the physical contact. For example, the second device will detect a contact when a user holds the mobile device against the display of the second device. The mobile device detects when it is oriented in a particular orientation. For example, the mobile device detects when its own orientation matches the orientation of the display of the second device. The mobile device notifies a server that the mobile device has been oriented in the particular orientation. The server determines that the detected physical contact occurred while the mobile device was oriented in the particular orientation. Based at least in part on this determination, the server initiates a pairing of the mobile device and the second device. Once paired, the devices are able to share data with each other using the pairing.

The technology will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

For a better understanding of the technology, reference is made to the following description, taken in conjunction with the accompanying drawings, in which like reference characters refer to like parts throughout, and in which.

Figure 1:
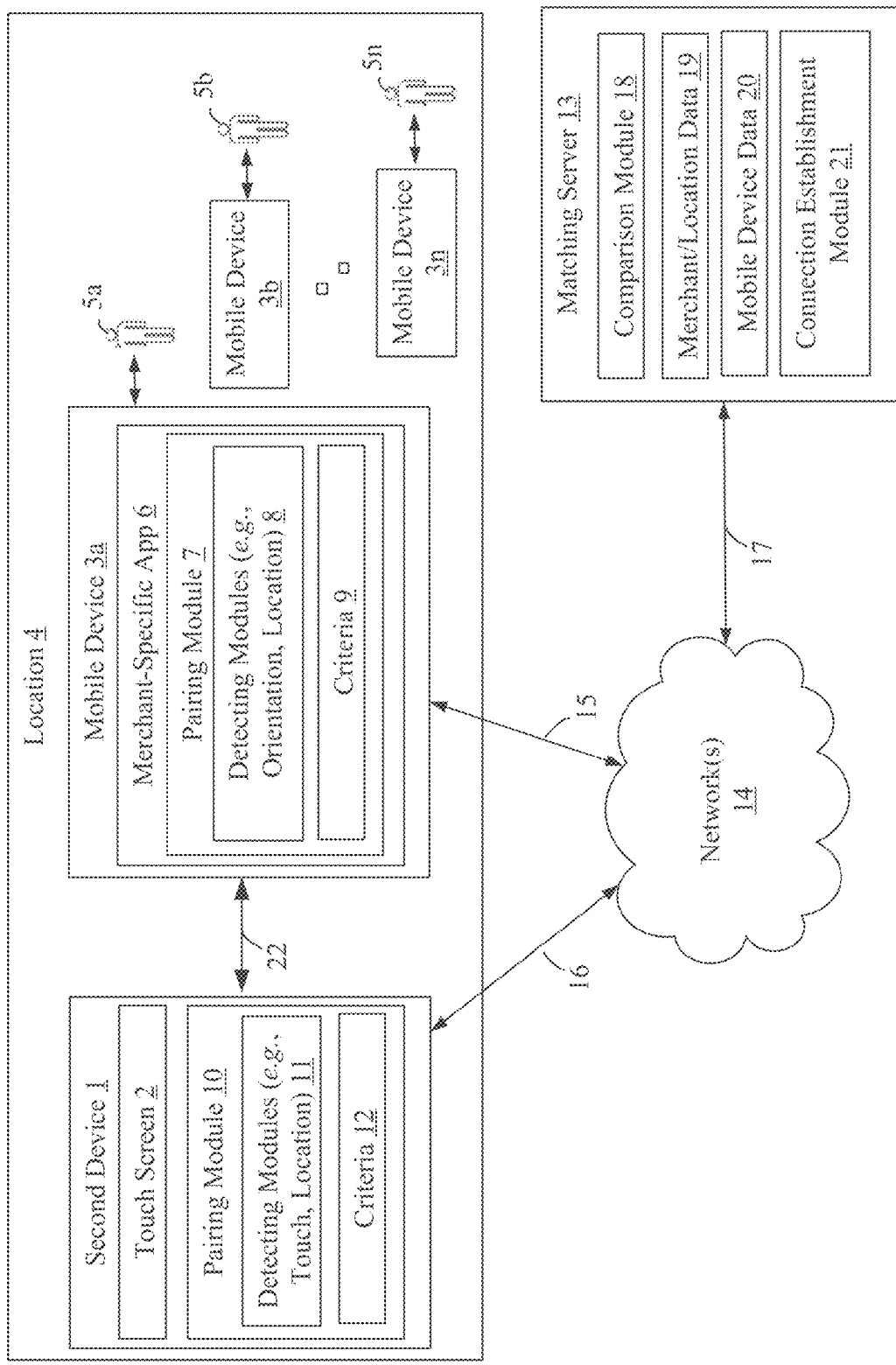
FIG. 1 illustrates a block diagram of an exemplary system for pairing a mobile device and a touch screen device in accordance with one or more aspects of the described technology.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE DISCLOSED TECHNOLOGY

The following description provides improved techniques for pairing a mobile device with another device. As discussed above, existing pairing techniques fail to make mobile device pairing with on-location devices simple, intuitive, and quick enough to satisfy most users' expectations. Embodiments of the invention enable pairing using simpler and more intuitive user actions by recognizing a simple user action to initiate pairing using both of the devices involved in the pairing. Using both devices to detect the user action allows a simpler action to be used to initiate the pairing, limits the need for the user to otherwise manually identify the devices involved in the pairing, and facilitates more accurate detection of the user's intention to pair the devices. In one example embodiment, the simple user action involves a user placing the mobile device flat against a touch screen of the second device so that the back of the mobile device is flat against the surface of the touch screen.

A sensor on the mobile device detects the user action by determining that the mobile device has a particular orientation and a sensor on the second device detects the contact with the touch screen. The information from these sensors from the two devices is coordinated to determine that the mobile being in the particular orientation happened at approximately the same time in approximately the same location as the touch and thus to accurately recognize the occurrence of the simple user action to initiate pairing, i.e., the user placing the mobile device flat against the screen of the second device.

Embodiments of the invention coordinate sensor/detector information from both of the devices involved in the pairing to accurately recognize a simple user action to initiate pairing between the two devices. In one embodiment, a server coordinates information from the two devices to identify the user action to pair the devices. In this example, the second device, which includes a touch screen, determines that the mobile device has made contact with the touch screen, determines the time that the contact event occurs, and sends an electronic message to a server (which can be remote or local) indicating the time that the contact took place. The mobile device, which in this example has a software application ("app") running thereon, determines, via the app that it has been placed into a predetermined orientation in a three coordinate axis, determines the time at which this event occurs and sends the time to the same server. The server receiving the event information from both of the devices determines if the events match, for example, by comparing event timestamps and device location information. If the orientation event of the mobile device matches the touch event of the second device, pairing of the two devices is initiated or otherwise authorized. For example, the server will itself establish the pairing and/or send electronic messages to both of the devices to complete the pairing. In this example, the user performs a simple action, placing the mobile device flat against the touch screen of the second device and the pairing is established without further user action.

The pairing techniques disclosed herein are applicable to pairing any two devices that each have sensors capable of detecting a single user action. Thus, the techniques are applicable using any mobile device that can determine its own orientation, motion, and/or otherwise detect a simple user action and any second device that can detect the same simple user action using its own touch screen, motion, camera, other sensor, and/or through geofencing or some similar technology that can determine when the mobile device comes within a predetermined distance from the second device.

In the above-described example, pairing of the mobile device with the second device is initiated by the user placing the mobile device in a particular orientation and touching the second device with the mobile device. The second device can detect the touch and/or one or more attributes of the touch to identify the user action. In one embodiment, the mobile device is placed with its back flat against the touch screen and thus contacts the touch screen in a rectangular touch area. The second device in one embodiment simply detects a touch regardless of the size and/or location of the touch. However, in another embodiment, the second device detects the size and/or shape of the touch, for example, to recognize that the size and shape of touch corresponds to a mobile device. As a specific example, the second device may recognize that the touch is in an area of the touch screen that is at least 50 pixels×50 pixels, 2 inches×2 inches, etc.

The mobile device detects when the orientation of the mobile device is in a particular orientation to recognize the simple user action. That particular orientation may be predefined and stored in the mobile device. For example, one implementation uses vertical on-location touch devices that, for example, hang on walls or otherwise are oriented such that the device touch screen surfaces are in a plane that is approximately perpendicular to the ground, horizon, etc. Mobile devices with their backs flat against such vertical touch screen devices will also have a vertical orientation (i.e., a screen plane perpendicular to the ground, horizon, etc.). Accordingly, the mobile devices can include logic to detect when the mobile devices are placed a vertical orientation (matching the known orientation of the touch screen device) to identify when the simple user action is occurring. The context in which the orientation of the mobile device is detected can also be limited to further improve the accuracy of the detection process. For example, the mobile device may only detect being in the particular orientation while a particular app is being used on the mobile device, such as an app specific to a merchant of a store in which the user is located.

In the above-described specific, but non-limiting example, the user places the mobile device flat against the screen of the second device. This user action is intuitive and requires minimal (or no) user selections or other input on the devices themselves. For example, the user is not necessarily required to enter his user identity on either device or identify and select which devices are to be paired. The technology recognizes the consumer's intention to pair the devices based on detecting the movement and location of the mobile device and the touch on the second device. The correlation of two metrics (i.e., the time of the physical contact and the time of the orientation) are sufficiently unique to provide an accurate determination that the intent is to pair the devices and provide sufficient information to the server to determine the identity of the devices to be paired. The server receives this information, determines that a match exists and then authorizes or otherwise initiates the pairing between the devices. Additionally, the fact that both devices take part in the determination to establish the pairing (e.g., the mobile device detecting the orientation event and the second device detecting the contact event) further ensures the accuracy of the pairing process. This technology improves the procedure for pairing electronic devices by making the user's input requirements less complicated and by simplifying the technology required between the devices for the pairing itself.

As used herein, the phrase "pairing" refers to creating an association between devices such that the devices can communicate directly and/or indirectly with one another. Examples of conventional "pairings" include, but are not limited to Bluetooth pairing, establishing wifi device communications, and establishing wireless network communications. A pairing between a mobile device and a second device involves establishing permission for direct communication between the devices in one example. In another example, a pairing between a mobile device and second device involves establishing communication using an intermediary device located at the same or another venue. The following term definitions are provided for convenience. Reference to a term and/or its definition or a term from its definition will be used interchangeably herein to the extent that such use does not render the content indefinite.

As used herein, the phrase "mobile device" refers to any portable, processor-based device which has the ability to communicate with a remote server and which has the ability to determine (using internal or external elements) its orientation in 3-dimensional space. A non-exhaustive list of examples of mobile devices includes, but is not limited to, personal digital assistants (PDA), mobile phones, tablets, e-readers, portable game units, smart watches etc.

As used herein, the phrase "second device" refers to any processor based device which includes a display and the ability to detect when another device comes into contact with the second device (e.g. through a touch screen, or sensors located within or around the device). Reference to contact with the display and/or reference to contact with the second device will both be broad enough to encompass the display and/or another portion of the second device. Second devices may include, but are not limited to desktop computing devices, laptop computing devices, mobile computing devices, tablets, smart televisions, and other touch screen devices that are provided in retail, transit, and other public, private or semi-private locations, which provide interactive information to consumers, travelers, and other users.

As used herein, the phrase "display" refers to an electronic component that displays an image or series of images based on electronic information defining the images. Touch screen display technology is widely available and has the capability to detect the contact event. Devices that often have displays (e.g. touch screens) include, but are not limited to, mobile devices, desktop computing devices, laptop computing devices, televisions, projectors, kiosks and billboards.

As used herein, the phrase "physical contact" refers to a touch that occurs in the real world. A mobile device making physical contact with another device involves one or more portions of the mobile device directly or indirectly physically touching the other device. For example, a smart phone in a protective case makes physical contact with another device when the protective case touches the display of the other device.

As used herein, the phrase "orientation" refers to how a mobile device is positioned relative to a reference point, reference plane, or other reference. In one example, a device is assigned a top and its orientation is determined based on which direction (up, down, east, west, south, north, or some direction in between) the top is facing. In this example, "up" is determined based on gravity and one or more sensors or meters in the device determine the direction. In another example, a device may be assigned a "face direction" such as the direction facing out perpendicularly from a display screen and/or a "face plane" based on the plane of the display screen. Comparing the orientations of devices that have screens involves determining whether the devices have the same (or opposite) face directions and/or parallel face planes in one or more embodiments of the disclosed technology. For example, if a user holds the screen of his mobile phone against a touch screen television hanging on a wall such that the plane of screen of the mobile phone is parallel to the plane of the television screen, the devices have the same orientation. In another example, an orientation of a device may refer to only a component of its positioning. For example, a television hanging on a wall can be said to be "vertical" regardless of its orientation with respect to compass direction. In this example, a mobile device that is also vertical can be considered to have the same orientation even if it has different compass orientation, e.g., the television faces west and the mobile phone faces east, south, etc.

As used herein, the phrase "match" refers to identifying features that are the same or substantial similar. An orientation can be determined to match another orientation when the orientations are identical (e.g., in terms of x, y, z coordinates), when they are substantially the same (e.g. one orientation direction is the same on both devices such as when both devices are vertical, but the other orientation direction is different such as the touch screen of the second device faces east and the front of the mobile device faces south west), or when they are otherwise found to be similar in a way that is measurable so that one orientation can consistently be compared with and identified as the same as another orientation.

As used herein, the phrase "timestamp" refers to a reference to a particular point in time or time range.

As used herein, the phrase "venue" refers to a particular location defined by one or more geographic or communication-based boundaries. Examples of venues include retail stores, buildings, transit stations, shopping malls, homes, business complexes, sports facilities, and portions of these.

FIG. 1 illustrates an exemplary system in accordance with one or more features of the disclosed technology. The system includes a second device 1 having a touch screen 2 and one or more mobiles devices 3a-n used by users 5a-n in a location 4, such as a store, transit station, airport, mall, or other venue. The one or more mobile devices 3 (a-n wherein n may be a small number or a large number depending on the design and capacity of the system) can be paired with the second device 1 using techniques disclosed herein. While multiple mobile devices 3a-3n are illustrated, for ease of explanation only, the following description will be limited to a single mobile device 3a.

The mobile device 3a include a merchant-specific app 6 that user 5a accesses while at location 4 to access functionality specific to the location 4 provided by a merchant that offers goods and services at the location 4. The merchant-specific app 6 includes a pairing module 7, including instructions executed by a processor to perform operations. The pairing module 7 includes detecting modules 8 that interacts with one or more detectors (not shown) on mobile device 3a to determine the orientation of the mobile device 3a. Examples of detectors that can be used to determine the orientation of the mobile device 3a include, but are not limited to, accelerometers and/or magnetometers.

The detecting modules 8 in this example also identify location 4. To identify location 4 or a sub-location within location 4, the detecting modules 8 can use mobile device 3a sensors (not shown) such as Global Positioning System (GPS) sensors and/or local area network detectors (not shown) from which a physical address or other geographic location can be identified. For example, such a sensor can determine that the mobile device 3a is at location 4 and/or likely near second device 1 based on mobile device 3a interacting with a particular cell tower, network router, GPS positioning elements, etc.

The merchant-specific app 6 also includes criteria 9 used in detecting an event indicative of a user action involving the mobile device 3a. In one example, the criteria 9 identify a specific orientation of the mobile device 3a and possibly a threshold amount of time that the mobile device 3a needs to be in that specific orientation as criteria indicating that the user 5a has oriented the device in a particular way, for example, flat against a known orientation of second device 1. The portion of the mobile device 3a (e.g. the front face, rear or side) that makes contact with the second device 1 does not matter in one embodiment of the invention, so long as the orientation (e.g. vertical, 60 degrees from the horizon, 45 degrees from the horizon, etc.) of the phone is the same as that of the second device. In another embodiment of the invention, the pairing process requires that a specific portion of the mobile device 3a contact the second device 1 and the devices include sensors to detect which portion of the mobile device 3a makes contact. In short, a variety of criteria can be used depending upon the particular system implementation and the nature of the user action that is used to initiate the pairing. In the event that the merchant-specific app 6 determines that the criteria 14 are met, the merchant-specific app 6 communicates to the matching server 13 information about the occurrence of a particular event, such as the time, location, and other attributes of the mobile device 3a having been detected in the predetermined orientation.

The embodiment of FIG. 1 illustrates a merchant-specific app 6, such as a merchant loyalty app, that, in addition to providing the pairing module, offers services from a particular merchant such as a merchant that offers products or services for sale at the location 4. In an alternative embodiment, the pairing module 7 is provided instead by an operating system or other general purpose app. For example, an operating system or other general purpose app can be configured to begin detecting the mobile device's orientation based on the mobile device's geographic location. For example, a general purpose setting on a mobile device 13 operating system may allow the user to turn on an auto-pairing feature that detects whenever the mobile device 13 is at particular venues (e.g., particular stores, transit states, etc.), and automatically detects the mobile device 13's orientation in those locations and/or initiates pairing in those locations based on detecting particular events such as the mobile device 13 being oriented in a particular orientation.

The system of FIG. 1 also includes a second device 1 such as a kiosk, laptop computer, desktop computer, advertisement billboard, directory, a smart screen, television, or any other device deployed at location 4 to provide information and/or services to users 5a-n visiting location 4. In this example, the second device 1 includes a touch screen 2 and a pairing module 10 including instructions executed by a processor to perform operations. The pairing module 10 includes detecting modules 11 and criteria 12. The detecting modules 11 include a touch detection module that detect that something has made contact (as opposed to a tap or an inadvertent contact) with the second device 1. In one example, second device 1 is configured to detect a pairing contact at any location on the touch screen 2. In another example, the second device 1 is configured to detect a specific area or areas of the touch screen 2. For example, a rectangle may be displayed on the second device 1 with an instruction for the user to "Place mobile device flat against the screen inside this rectangle to connect devices." In this example, the second device 1 will detect touches within the specified rectangle on the touch screen 2 and use only those touches in process to initiate pairing. In another example, the second device 1 is configured to additionally or alternatively detect a contact with a portion of the second device 1 that is not on the touch screen 2 using additional detectors, such as camera or video capture devices, to determine that the contact was made.

In one embodiment of the invention, the detecting modules 11 also include location sensors such as GPS sensors and/or local area network detectors from which a physical address or other geographic location can be identified. For example, such a sensor can determine that the second device 1 is at location 4 and/or at a particular sub-location within location 4. In another example, second device 1 and/or matching server 13 store information about the location the second device 1 that is automatically detected by the second device 1 or manually entered by an installer or other operator who knows the location 4 or sub-location of the second device.

The system of FIG. 1 further includes a matching server 13 that communicates with the mobile device 3a and the second device 1 via network 14 (e.g. the Internet), a direct wired connection, a wireless connection, a satellite connection or via any other communication path. The communication path 15/17 between the mobile device 3a and the matching server 13 and/or the communication path 16/17 between the second device 1 and the matching server 13 may be a secure path or an unsecure path depending upon the design choice of the system and/or the requirements of a particular operation.

The matching server 13 includes a comparison module 18 that determines if an orientation event detected by the mobile device 3a matches a touch event detected by second device 1 to identify that the user 5a perform the specific action, such as an action placing the mobile device 3a with the mobile device 3a's back flat against the touch screen 2 of the second device 1. The occurrence of the two events being detected separately by the two devices facilitates accurate detection of the particular user action. The comparison module 18 is thus configured to store and compare merchant/location data 19 about the second device 1 and events that the second device 1 detects and mobile device data 20 about the mobile device 3a and events that mobile device 3a detects. The comparison can involve comparing time, location, and other attributes of the events. For example, the comparison can involve determining whether a timestamp of the contact with the second device 1 matches a timestamp for the orientation event of the mobile device 3a.

The matching server 13 also includes a connection establishment module 21 for pairing the devices 1, 3a when the comparison module 18 determines that the orientation event detected by the mobile device 3a matches a touch event detected by second device 1. In one example, the matching server 13 sends a first message to the mobile device 3a and a second message to the second device 1 to inform the respective devices 1, 3a that the pairing 22 has been authorized or otherwise to facilitate the pairing. In one example, the messages sent to the mobile device 3a and second device 1 identify the devices to one another and automatically initiate a pairing 22 between the devices 1, 3a. In one embodiment, no further user interaction beyond positioning the mobile device 3a flat against the touch screen 2 of second device 1 is required to complete a pairing 22. In another embodiment, minimal additional user interaction, such as selecting a pairing confirmation option, is requested from the user 5a of mobile device 3a to complete the pairing 22.

While the description has been limited to a single mobile device 3a, a single second device 1, and a single matching server 16, the technology is not required to be so limited. Multiple mobile devices 3a-n (the same or different types), multiple second devices 1 (the same or different types) and/or multiple matching servers 13 are used in alternative implementations. Moreover, mobile device 3a-n can be configured with multiple merchant-specific apps and/or otherwise be configured to pair with numerous different devices in numerous locations operated by numerous and differing merchants and other entities.

Figure 2:
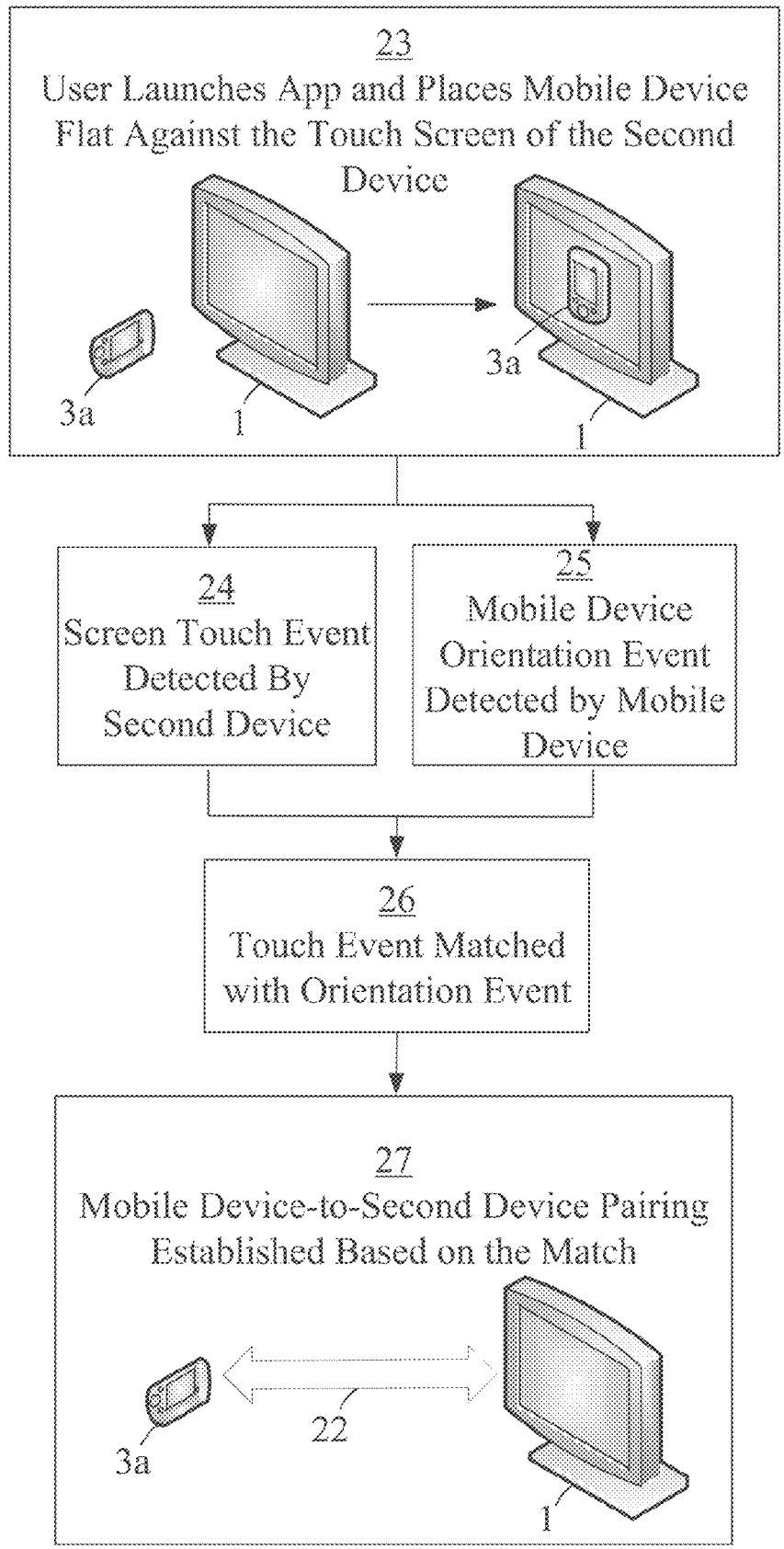
FIG. 2 is a flowchart illustrating an exemplary pairing of a mobile device and a touch screen device in accordance with one or more aspects of the described technology.

FIG. 2 is a flowchart illustrating an exemplary pairing 22 of a mobile device 3a and a second device 1 in accordance with one or more embodiments of the invention. FIG. 2 illustrates a preferred, but not required operation of the exemplary system illustrated in FIG. 1. In FIG. 2, the user is in a location, such as a store, transit station, or other venue, that offers one more touch devices, such as second device 1, with which the user can interact.

In block 23 of FIG. 2, the user launches an app on mobile device 3a and places the mobile device 3a flat against the touch screen of the second device 1. The app on the mobile device 3a detects when an orientation of the mobile device 3a matches a predetermined orientation. Identifying the mobile devices orientation allows detection of the mobile device 3a having been placed flat against the touch screen of the second device 1. The app can be launched at the time the consumer determines that he/she wishes to interact with the second device 1 or the app could be launched prior to that time and thus already be running, for example as part of the operating system, on the mobile device 3a. The second device 2 screen and/or a screen on the mobile device 3a may provide instructions providing information to the user regarding how to initiate pairing of the devices and/or identifying the benefits of the pairing. In one example, the second device 1 screen in a merchant retail store displays a message "Place your mobile device flat against this screen in the box below for an interactive map showing locations in this store of the items on your wishlist." In another example, the second device 1 screen in an airport displays a message "Tap your mobile device flat anywhere on this screen to retrieve and display current gate and status information for your upcoming flight." In another example, the second device 1 displays a message "Platinum members: Hold your mobile device flat in the box below for 2 seconds to access premium services on this kiosk." The particular messages, touch requirements, and features provided will of course depend upon the particular implementation and features.

In circumstances in which, a time threshold is used (e.g., requiring the mobile to be positioned for at least 1 second, 2 seconds, 5 seconds, etc. against the touch screen of the second device 1), the touch screen on the second device 1 and/or the screen of the mobile device 3a can change when the time threshold is satisfied by the user. For example, one or both of the screens can change colors or display an indicator or messaging thanking the user for performing the action or confirming that the action was performed correctly, e.g., with a message that states "Mobile device detected—Pairing in progress."

At block 24 of FIG. 2, the second device 1 detects a screen touch event. Specifically, the second device 1 detects that something has contacted the second device 1. The second device 1 determines whether the contact satisfies the criteria for the screen touch event. For example, the second device can determine whether the contact lasted for a sufficient length of time, whether the contact with the second device was relatively still, whether the area of the contact is in a particular location and/or whether the contact has a particular size (e.g., more than 2 inches×2 inches, etc.) and/or shape (e.g., rectangular, etc.). In one embodiment of the invention, to improve accuracy and avoid unnecessary communications, the second device 1 applies criteria that require that the touch lasts for at least a predetermined period of time before communicating that a touch event, for example, to matching server 13.

At block 25 of FIG. 2, the mobile device 3a detects a mobile device orientation event. In this example, the application on the mobile device 3a detects the orientation of the mobile device 3a satisfies particular criteria, such as a particular orientation type (e.g., vertical, horizontal, etc.) or angle (e.g., within 5 degrees of perpendicular to the ground, etc.), that the orientation was relatively still, that the orientation lasted for more than a predetermined amount of time (e.g., 10 ms, 50 ms, 1 second, 2 seconds, 5 seconds, etc.), and any other appropriate criteria. In one embodiment of the invention, to improve accuracy and avoid unnecessary communications, the mobile device 3a applies criteria that require that the orientation lasts for at least a predetermined period of time before communicating that an orientation event, for example, to matching server 13.

At block 26 of FIG. 2, the touch event detected by the second device 1 is matched with the orientation event detected at the mobile device 3a. The matching can occur at a separate server and/or on either or both of the mobile device 3a and second device 1. The touch event and orientation event are matched by comparing attributes of the respective events with one another. In one embodiment, the events are matched based on determining that the events occurred at approximately the same time as one another. In another embodiment, the locations of the devices (e.g., both being within a particular retail store location) is also used to match the events.

One embodiment of the invention facilitates matching the events by determining that the events happened at approximately the same time using timestamps. For example, when the application on the mobile device 3a detects the orientation event, the mobile device 3a sends a timestamp of the orientation event detection to the matching server 13 (FIG. 1). Similarly, when the second device 1 detects the touch event, the second device 1 sends a timestamp of the touch event to the same matching server 13 (FIG. 1). Because both events happened substantially at the same moment, they can be correlated to each other taking into account the possibility that the timestamps may differ slightly due to device and other differences.

Additional information that is provided from the mobile device 3a to facilitate the matching in one or more embodiments of the invention includes, but is not limited to, information identifying the mobile device 3a, the user of the mobile device 3a, the geographic location of the mobile device 3a, one or more local networks that the mobile device 3a is using, the cell tower that a phone on the mobile device 3a is accessing, and/or information about other devices with which the mobile device 3a has recently been paired. In short, additional information about the orientation event that can be useful in confirming the nature of the orientation event as being a particular user action, e.g., the user holding the mobile device against the device in particular way, can be collected by the mobile device 3a and provided for us in the event matching process.

Additional information that is provided from the second device 1 to facilitate the matching in one or more embodiments of the invention include, but is not limited to, information identifying the second device 1, the location of the second device 1 (e.g., the store, transit station, mall, public area, or other area), the sub-location of the second device 1 (e.g., in the toy department, on the wall adjacent the help desk, etc.), the orientation of the second device (e.g., vertical, horizontal, within 5 degrees of vertical, facing the front of the store, etc.), the area of the contact, the size and/or shape of the contact, the stillness of the contact, the length of time the contact lasted, the pressure of the contact, a movement associated with the contact (e.g., swiping, sliding, rotating, etc.), detection of persons using cameras, heat, or other sensors near the second device 3a, etc. In short, additional information about the touch event that can be useful in confirming the nature of the touch event as being a particular user action, e.g., the user holding the mobile device against the device in particular way, can be collected by the second device 1 and provided for us in the event matching process.

At block 27 of FIG. 2, the mobile device to second device pairing is established based on the touch event matching the orientation event. In one embodiment of the invention, this involves the matching server 13 establishing the pairing and/or informing both the mobile device 3a and the second device 1 that the pairing was established.

Once the devices 1, 3a are paired, the devices 1, 3a can share information including, but not limited to, all or part of their respective displays. In one embodiment of the invention, the second device 1 pulls information from the mobile device 3a onto the display of the second device 1 or otherwise using information about the user or from the mobile device 3a. In one embodiment, the user uses user interface controls on the mobile device 3a to control what is displayed on the second device 1. For example, mobile device may display the user's wish list (keeping this information private so that others in the store cannot see the items) and allow the user to select an item on the wish list to see the in-store location of the selected item on a map provided on the second device 1.

In one embodiment of the invention, the information that is shared between the devices 1, 3a via the pairing about the user and/or from the user's mobile device 3a is limited, for example, to protect the user's privacy. In one example, the shared information is limited to information that is available to the app running on the mobile device 3a. In one embodiment of the invention, any information that is available to one device is available or made available to the other device only while paired.

Once paired, the second device can provide information that is targeted or otherwise customized for the user of the mobile device 3a. In one embodiment of the invention, the entire second device 1 is devoted to a single mobile device 3a. In another embodiment of the invention, a portion, such as the bottom left quarter, etc., of the second device 1 screen is devoted to a particular mobile device 3a so that the second device can provide information to multiple users at the same time. In one example of this, each user-specific portion of the second device 1 is configured with its own pairing functionality, e.g., a user action pressing a mobile device flat against a particular portion allows that user to use that portion, etc. Thus, second device 1 may pair with multiple mobile devices 3a-n at the same time and the area of use for each mobile device can be determined by and limited to an area proximate to the location of contact by the respective mobile device.

The pairing 22 between the mobile device 3a and the second device 1 can be discontinued based on user action or automatically. For example, the pairing 22 can be configured to only last for a predetermined amount of time, e.g., 1 minute, 2 minutes, 5 minutes, etc., unless the pairing user action is repeated. Similarly, the pairing can be automatically discontinued if no user interaction on the mobile device 3a and second device 1 is received for a threshold amount of time. Additionally, or alternatively, the pairing can be discontinued based on detecting that the mobile device has performed another specific user action or been moved outside of the location or vicinity of the second device 1, etc. In one embodiment, the pairing only lasts while the user action is performed, e.g., while the mobile device 3a is placed flat against the screen of the second device 1. Once the mobile device 3a is removed from the second device 1, the devices 1, 3a will discontinue to share displayed information. Such a disconnect occurs immediately upon removal of the mobile device 3 from the second device 1 in one embodiment of the invention. In another embodiment, the devices 1, 3a are configured to wait a predetermined amount of time before disconnecting. In addition, or as an alternative, either or both devices 1, 3a can present user interface options, such as, a button to press or a slide to slide, to discontinue or pause the pairing.

Figure 3:
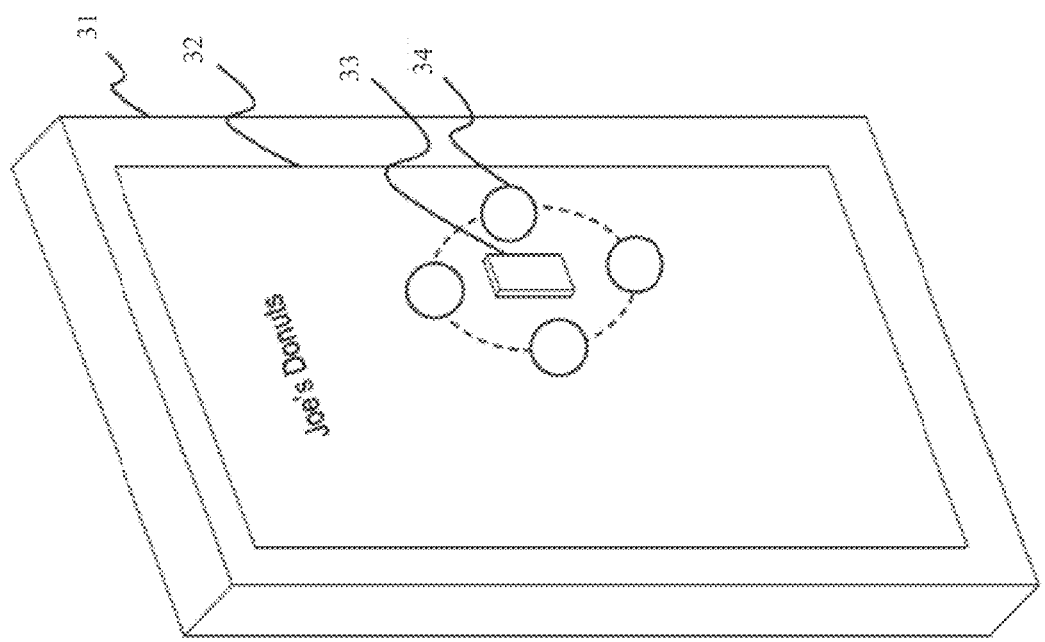
FIG. 3 illustrates an exemplary interaction between a mobile device and a touch screen device in accordance with one or more aspects of the described technology.

FIG. 3 illustrates an exemplary interaction between a mobile device 33 and a touch screen device 31 that includes a touch screen 32. In this example, the touch screen device 31 has a vertical orientation relative to the horizon or ground. For example, such a touch screen device 31 may be mounted flat on a wall in a store, transit station, or other public location to provide information to users that visit the location. FIG. 3 illustrates an exemplary interaction between the mobile device 33 and the touch screen device 31 in which the user places the mobile device 33 with the back of the mobile device 33 flat against the front of the touch screen 32 of the touch screen device 31. Specifically, the user places the mobile device 33 flat within an area 34 on the touch screen 32 of the touch screen device 31 to initiate pairing of the mobile device 33 with the touch screen device 31.

The pairing process is configured to recognize when the devices 31, 33 have the same orientation when a touch event occurs in order to more accurately recognize when the mobile device 33 has been placed flat on the touch screen device 31. Thus, since the orientation of the touch screen device 31 is known to be vertical, the mobile device 33 is configured to recognize when the mobile device 33 has a matching orientation, i.e., vertical. The devices are paired based on detecting the matching orientations and based on detecting a touch event on the touch screen device 31 at approximately the same time that the mobile device 33 orientation matches that of the touch screen device 31. The mobile device 33 detecting that the devices 31, 33 have the same orientations and the touch screen device 31 detecting a touch event occurring are compared and, if occurring at approximately the same time, are used to determine that the specific user action has very likely occurred—that the user has very likely intentionally placed the mobile device 33 flat against the touch screen 32 of the touch screen device 31 to initiate pairing between the devices 31, 33.

Figure 4:
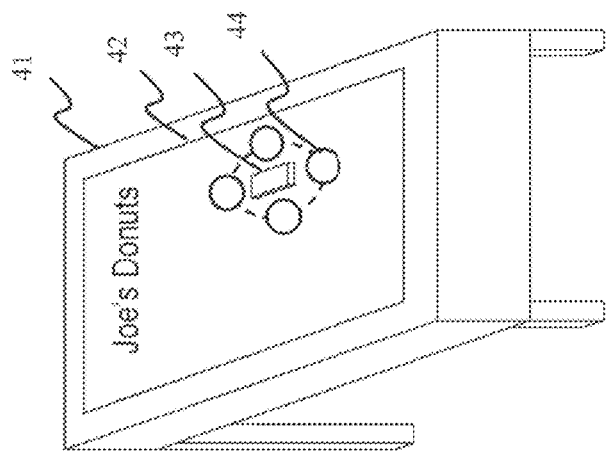
FIG. 4 illustrates an alternate example of an interaction between a mobile device and a touch screen device in accordance with one or more aspects of the described technology.

FIG. 4 illustrates an alternate example of an interaction between a mobile device and a touch screen device in which the touch screen device 41 is not vertical relative to the ground or horizon. In such an embodiment, the system is programmed such that the angle of the display screen 42 for the touch screen device 41 is known and an app on the mobile device 43 is configured to determine when the orientation of the mobile device 43 matches that of the display screen 42 of the touch screen device 41. When the orientations are determined to match, the devices 41, 43 are paired. In one embodiment of the invention, the orientation of the touch screen device 41 is adjustable or otherwise changed. In such a circumstance, either the touch screen device 41 or the mobile device 43 includes a detector/sensor that determines the orientation of the touch screen device 41 or the orientation will be entered manually when it is changed orientation.

Figure 5:
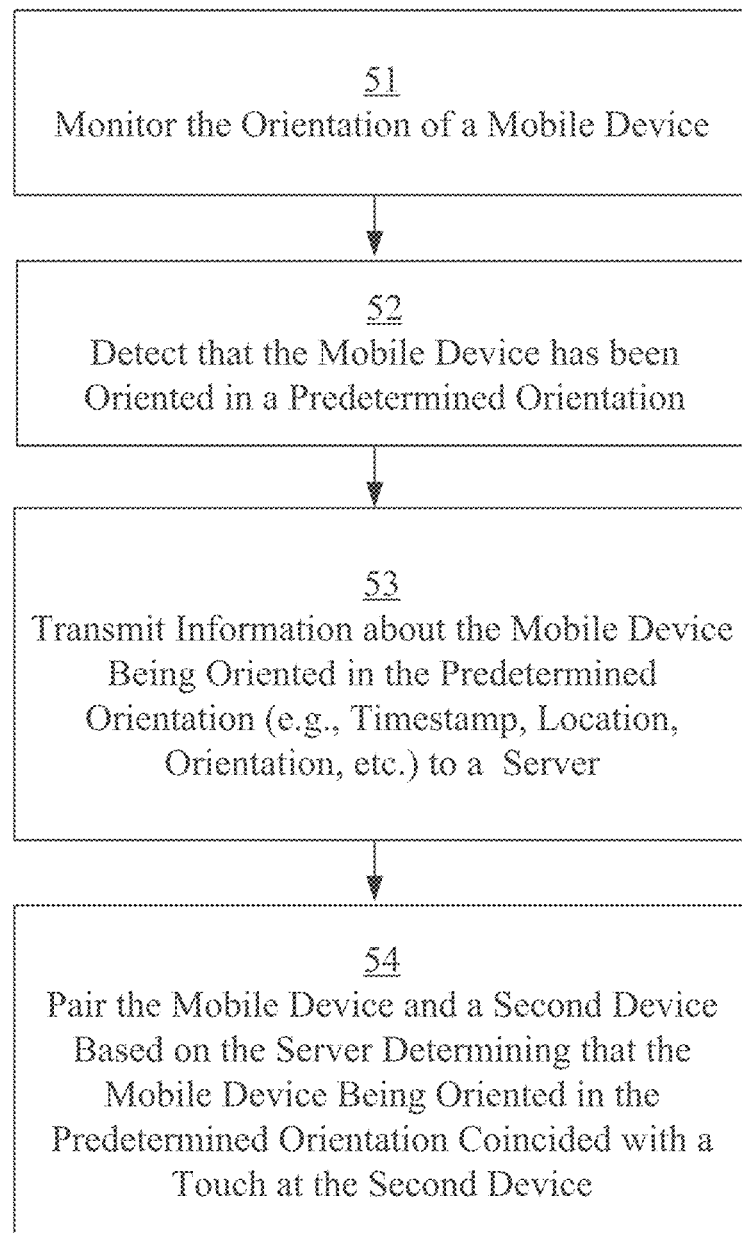
FIG. 5 is a flowchart illustrating an exemplary method for pairing a mobile device with a second device based on detecting a user action orienting the mobile device in a particular orientation while the mobile device is touched against a touch screen of the second device.

FIG. 5 is a flowchart illustrating an exemplary method 50 for pairing a mobile device with a second device based on detecting a user action orienting the mobile device in a particular orientation while the mobile device is touched against a touch screen of the second device. The exemplary method 50 can be performed by mobile devices 3a-n of FIG. 1 or by any other suitable devices.

Method 50 involves monitoring the orientation of a mobile device, as shown in block 51, and detecting that the mobile device has been oriented in a predetermined orientation, as shown in block 52. For example, the mobile device can use an accelerometer located within the mobile device to monitor the orientation of the mobile device and detect that the mobile device has been oriented in a predetermined orientation.

In one embodiment of the invention, the monitoring and detecting involves determining that the orientation of the mobile device matches the predetermined orientation within a predetermined margin of error. In one embodiment of the invention, the predetermined orientation is based on an orientation of the second device. For example, the predetermined orientation may be vertical relative to the horizon or ground based on the second device being oriented vertical to the horizon or ground. In implementations in which the predetermined orientation matches an orientation of the second device, the mobile device detects that the mobile device has been oriented in the predetermined orientation when the mobile device has been placed with a back of the mobile device flat against a surface of the touch screen of the second device.

Method 50 further involves transmitting information about the mobile device being oriented in the predetermined orientation (e.g., a timestamp, location, orientation, etc.) to a server, as shown in block 53. The server receives the information about the touch being detected by the touch screen of the second device and determines that the mobile device being oriented in the predetermined orientation coincided with the touch detected on the touch screen of the second device. In an alternative embodiment of the invention, instead of (or in addition to) using a server to make the determinations that are used to authorize the pairing, the mobile device itself receives information about the touch being detected by the touch screen of the second device and determines that the mobile device being oriented in the predetermined orientation coincided with the touch detected on the touch screen of the second device. In one embodiment of the invention, determining that the mobile device being oriented in the predetermined orientation coincided with a touch on the touch screen of the second device involves determining that a first timestamp identifying when the mobile device was oriented in the predetermined orientation matches a second timestamp identifying when the touch was detected by the second device and/or determining that a first location of the mobile device while oriented in the predetermined orientation matches a second location of the second device when the touch was detected by the second device.

Method 50 further involves pairing the mobile device and the second device based on the server determining that the mobile device being oriented in the predetermined orientation coincided with a touch at the second device, as shown in block 54.

Method 50 can, but does not necessarily, involve an app on the mobile device, such as a merchant-specific app. In one embodiment, the app interrogates detectors on the mobile device to monitor the orientation of the mobile device and detect that the mobile device has been oriented in a predetermined orientation. The app sends a message for receipt by a server indicating that the mobile device is in the predetermined orientation and the app receives a message from the server authorizing pairing of the mobile device with the second device.

In one embodiment, an app is launched on the mobile device and the mobile device logs-in to a server using the app. Once logged in, the app running on the mobile device will query detectors (e.g. an accelerometer) of the mobile device to determine an orientation of the mobile device in 3-dimensional space. The app could be configured to perform this function every time the phone moves, at regular intervals, every time the phone moves in a particular 2-dimensional direction, and/or at some other predefined time. When the app determines an orientation of the mobile device, it compares that orientation to a predetermined orientation, for example, a predetermined orientation that has been provided by the server. When the orientation matches the predetermined orientation, the app notes the time that the match occurs and sends that information (along with other identifying information such as but not limited to mobile ID, and GPS location) to the server. The app may be configured to require the orientation to remain in the predefined orientation for at least a predetermined period of time to minimize the number of messages to the server. Once the server determines that certain criteria have been met between the mobile device and a second device, the server authorizes the pairing of the devices and sends a message indicating the same to the devices. Once the mobile device receives the message from the server, the mobile device begins to share data with the second device 1 using the pairing.

Figure 6:
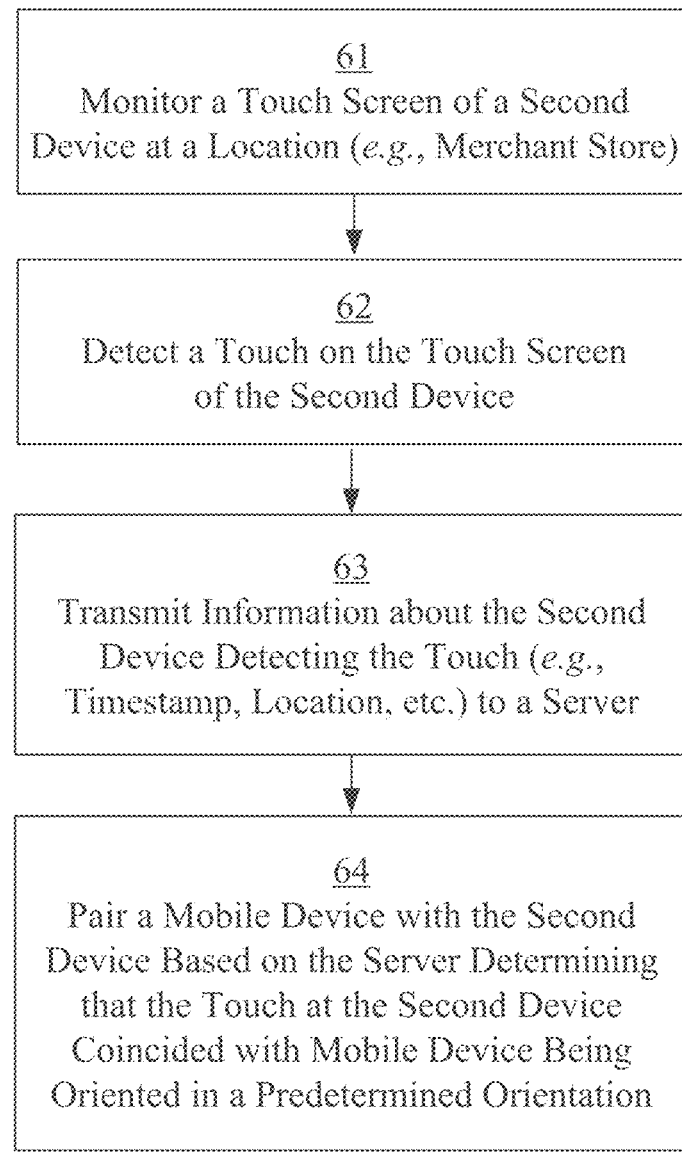
FIG. 6 is a flowchart illustrating another exemplary method for pairing a mobile device with a second device based on detecting a user action orienting the mobile device in a particular orientation while the mobile device is touched against a touch screen of the second device.

FIG. 6 is a flowchart illustrating another exemplary method 60 for pairing a mobile device with a second device based on detecting a user action orienting the mobile device in a particular orientation while the mobile device is touched against a touch screen of the second device. The exemplary method 60 can be performed by a touch screen device such as second device 1 of FIG. 1 or by any other suitable devices.

Method 60 involves monitoring a touch screen of a second device at a location (e.g., in a merchant store), as shown in block 61, and detecting a touch on the touch screen of the second device, as shown in block 62. In one embodiment of the invention, detecting the touch comprises determining a size and shape of a physical contact on the touch screen and other attributes of the touch and determining whether the attributes of the touch satisfy predetermined touch criteria.

In one embodiment, the second device is configured to detect a touch that matches a predetermined profile (e.g. the dimensions of a specific phone, or a contact that is greater than a certain area of contact or an area that is within a range of areas such as, but not limited to an area that is greater than 6 square inches but less than 150 square inches) to prevent the server from sending extraneous messages related to irrelevant contacts (e.g. a child outlining a picture with his/her finger). The second device may be configured to require the touch to remain for at least a predetermined period of time to minimize the number of irrelevant messages to the server.

Method 60 further involves transmitting information about the second device detecting the touch (e.g., a timestamp, a location, etc.) to a server, as shown in block 63. The server receives the information about the touch and determines that the touch coincided with the mobile device detecting the mobile device being oriented in the predetermined orientation. In an alternative embodiment, instead of (or in addition to) using a server to make the determinations that are used to authorize the pairing, the second device receives information about the mobile device detecting the mobile device being oriented in the predetermined orientation and determines that the touch coincided with the mobile device detecting the mobile device being oriented in the predetermined orientation. In one embodiment of the invention, determining that the touch detected by the touch screen coincided with the mobile device detecting the mobile device being oriented in a predetermined orientation comprises matching timestamps and possibly locations associated with the touch and orientation events.

Method 60 further involves pairing a mobile device with the second device based on the server determining that the touch at the second device coincides with the mobile device being oriented in a predetermined orientation, as shown in block 64.

Figure 7:
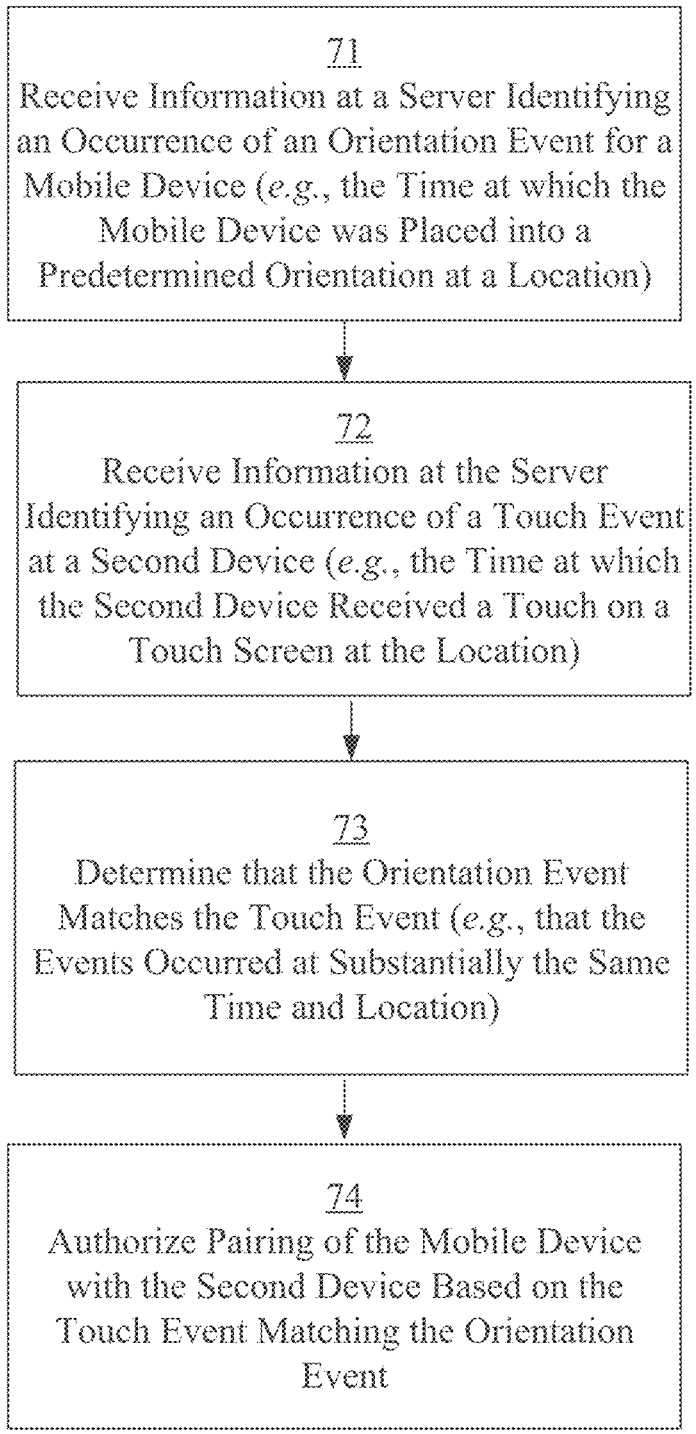
FIG. 7 is a flowchart illustrating an exemplary method of a server authorizing the pairing of a mobile device with a second device based on detecting a user action orienting the mobile device in a particular orientation while the mobile device is touched against a touch screen of the second device.

FIG. 7 is a flowchart illustrating an exemplary method 70 of a server authorizing the pairing of a mobile device with a second device based on detecting a user action orienting the mobile device in a particular orientation while the mobile device is touched against a touch screen of the second device. The exemplary method 70 can be performed by a server such as matching server 13 of FIG. 1 or by any other suitable devices. Method 70 involves receiving information at a server identifying an occurrence of an orientation event for a mobile device (e.g., the time at which the mobile device was placed into a predetermined orientation at a location), as shown in block 71. Method 70 further involves receiving information at the server identifying an occurrence of a touch event at a second device (e.g., the time at which the second device received a touch on a touch screen at the location), as shown in block 72. The method 70 further determines that the orientation event matches the touch event (e.g., that the events occurred at substantially the same time and location), as shown in block 73. Method 70 further involves authorizing pairing of the mobile device with the second device based on the touch event matching the orientation event, as shown in block 74.

In one embodiment of the invention, the server compares the time of an orientation event from the mobile device and the time of a touch event from the second device and determines if the times are the same or are the same within a margin of error. The server may also be configured to determine that the physical location of the devices is the same, to prevent erroneously pairing devices that, by sheer coincidence, happen to have met the requirements at the same time but in different physical locations.

There are many potential uses for the technology disclosed herein. The following is a non-exclusive, non-limiting description of several potential uses for the technology. A possible example includes the second device being located within a merchant establishment. Once paired, the second device display provides a list of sale items, a shopping cart for electronic purchases, a directory of available items, access to the merchant's website, etc. Another possible example includes an advertisement at a bus stop which provides the consumer with access to the merchant's website, indicates the closest brick and mortar locations for the merchant etc. Still another example is a second device located at a stadium or arena, where the second device provides the ability to purchase tickets, provides directions to selected seats or concession stands, provides information about the current and future shows, etc. In another example, the second device is provided in a supermarket and highlight items on a grocery list or send a list to a personal shopper for retrieval. There are countless possibilities for the technology.

Variations from the described embodiments exist without departing from the scope of the embodiments of the invention. For example, the techniques and systems may employ geofencing to determine when a mobile device comes within a certain distance from the second device and begin the pairing process at that point.

Additionally, or alternatively, the techniques and systems could use geofencing subsequent to the pairing to allow the consumer to remove the phone from the display of the second device and still operate on the display of the second device via the pairing. Although particular embodiments and examples have been disclosed herein in detail, this has been done for purposes of illustration only, and is not intended to be limiting with respect to the scope of the claims, which follow. In particular, it is contemplated by the inventors that various substitutions, alterations, and modifications may be made without departing from the spirit and scope of the technology as defined by the claims. Other aspects, advantages, and modifications are considered to be within the scope of the following claims. The claims presented are representative of the technology disclosed herein. Other, unclaimed technology is also contemplated. The inventors reserve the right to pursue such technology in later claims.

Exemplary Computing Components

Figure 8:
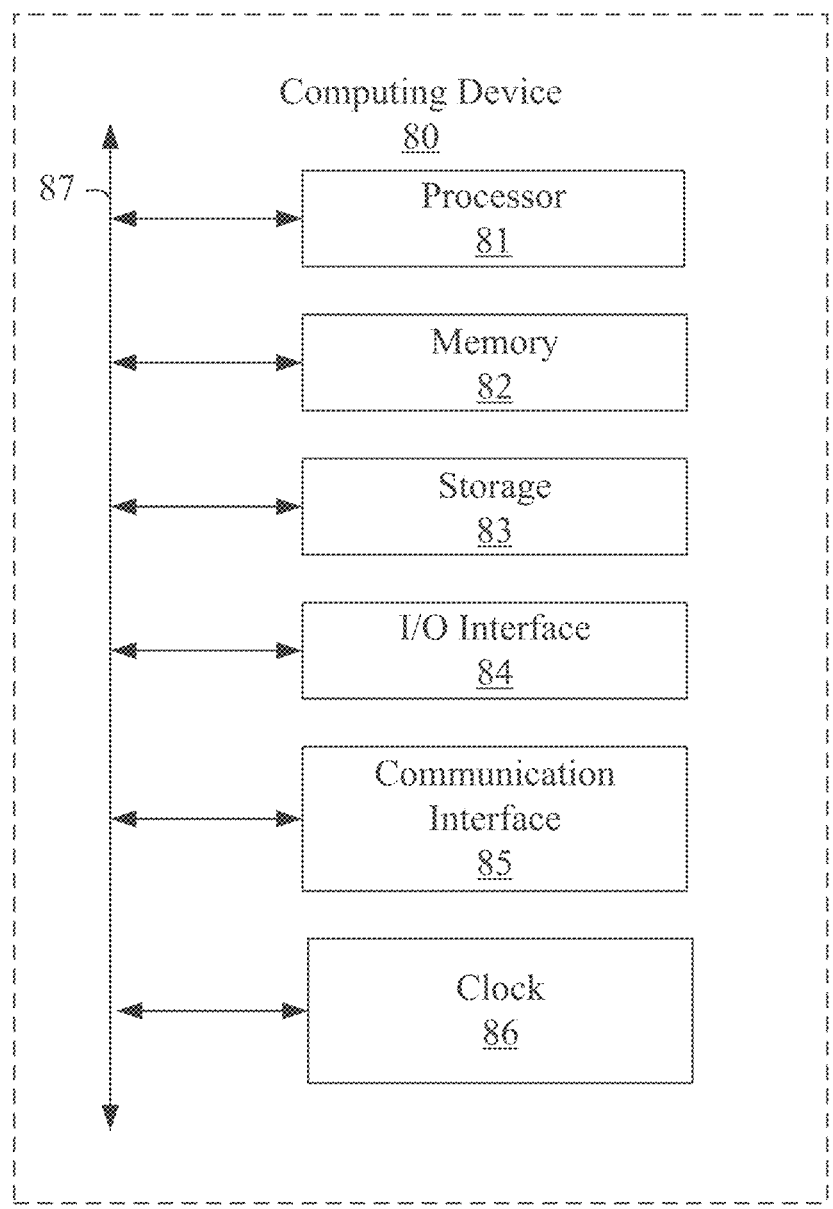
FIG. 8 illustrates a block diagram providing elements present in the devices in the system of FIG. 1.

Any suitable computing system or group of computing systems can be used to implement the techniques and methods disclosed herein. For example, FIG. 8 is a block diagram depicting examples of implementations of such components. The computing device 80 can include a processor 81 that is communicatively coupled to a memory 82 and that executes computer-executable program code and/or accesses information stored in memory 82 or storage 83. The processor 81 may comprise a microprocessor, an application-specific integrated circuit ("ASIC"), a state machine, or other processing device. The processor 81 can include one processing device or more than one processing device. Such a processor can include or may be in communication with a computer-readable medium storing instructions that, when executed by the processor 81, cause the processor to perform the operations described herein.

The memory 82 and storage 83 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 80 may also comprise a number of external or internal devices such as input or output devices. For example, the computing device is shown with an input/output ("I/O") interface 84 that can receive input from input devices or provide output to output devices. A communication interface 85 may also be included in the computing device 80 and can include any device or group of devices suitable for establishing a wired or wireless data connection to one or more data networks. Non-limiting examples of the communication interface 85 include an Ethernet network adapter, a modem, and/or the like. The computing device 80 can transmit messages as electronic or optical signals via the communication interface 85. The clock 86 is configured to identify time stamps for events such as orientation events or touch events. A bus 87 can also be included to communicatively couple one or more components of the computing device 80.

The computing device 80 can execute program code that configures the processor 81 to perform one or more of the operations described above. The program code can include one or more modules. The program code may be resident in the memory 82, storage 83, or any suitable computer-readable medium and may be executed by the processor 81 or any other suitable processor. In some embodiments, modules can be resident in the memory 82. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Having described the technology, what is claimed as new and secured by Letters Patent is:

1. A method, performed by a mobile device, for pairing the mobile device with a second device based on detecting a user action orienting the mobile device in a particular orientation while the mobile device is touched against a touch screen of the second device, the method comprising:
   monitoring an orientation of the mobile device;
   detecting that the mobile device has been oriented in a predetermined orientation for a predetermined amount of time;
   based on detecting that the mobile device has been oriented in the predetermined orientation for the predetermined amount of time, recording a first timestamp identifying when the mobile device was oriented in the predetermined orientation;
   providing an indication on the mobile device that indicates the mobile device has been oriented in the predetermined orientation for the predetermined amount of time and that indicates a pairing process is being performed; and
   pairing with the second device, wherein the pairing is based on determining a second timestamp identifying when the touch was detected by a touch screen of the second device and comparing the first timestamp identifying when the mobile device was oriented in the predetermined orientation with the second timestamp identifying when the touch was detected and determining that a first location of the mobile device while oriented in the predetermined orientation matches a second location of the second device when the touch was detected by the second device to determine that the mobile device being oriented in the predetermined orientation coincided with the touch detected by the touch screen of the second device.

2. The method of claim 1 further comprising the mobile device transmitting information about the mobile device being oriented in the predetermined orientation to a server, wherein the server receives the information about the touch being detected by the touch screen of the second device and determines that the mobile device being oriented in the predetermined orientation coincided with the touch detected on the touch screen of the second device.

3. The method of claim 1, wherein the mobile device receives information about the touch being detected by the touch screen of the second device and determines that the mobile device being oriented in the predetermined orientation coincided with the touch detected on the touch screen of the second device.

4. The method of claim 1, wherein detecting that the mobile device has been oriented in said predetermined orientation comprises determining that the orientation of said mobile device matches the predetermined orientation within a predetermined margin of error.

5. The method of claim 1, wherein the predetermined orientation is based on an orientation of the second device.

6. The method of claim 1, wherein detecting that the mobile device has been oriented in a predetermined orientation comprises detecting that the mobile device is vertical relative to horizon or ground.

7. The method of claim 1, wherein the predetermined orientation matches an orientation of the second device, wherein the mobile device detects that the mobile device has been oriented in the predetermined orientation when the mobile device has been placed with a back of the mobile device flat against a surface of the touch screen of the second device.

8. The method of claim 1 further comprising the first device launching a software application (app), wherein said app:
   interrogates detectors on the mobile device to monitor the orientation of the mobile device and detect that the mobile device has been oriented in a predetermined orientation;
   sends a message for receipt by a server indicating that the mobile device is in the predetermined orientation; and
   said app receiving a message from the server authorizing pairing of the mobile device with the second device.

9. The method of claim 1, wherein said mobile device uses an accelerometer located within said mobile device to monitor the orientation of the mobile device and detect that the mobile device has been oriented in a predetermined orientation.

10. A method for pairing a mobile device with a second device based on detecting a user action orienting the mobile device in a particular orientation while the mobile device is touched against a touch screen of the second device, the method, performed by the second device, comprising:
   monitoring the touch screen of the second device;
   detecting a touch with the touch screen for a predetermined amount of time, the touch comprising a physical contact having a size and a shape on the touch screen;
   determining the size and the shape of the physical contact of the touch on the touch screen and that the touch occurred for the predetermined amount of time;
   providing an indication on the second device that indicates the mobile device has been oriented in the predetermined orientation for the predetermined amount of time and that indicates a pairing process is being performed;
   determining a second timestamp identifying when the touch was detected; and
   pairing with the mobile device, wherein the pairing is based on:
      determining that the size and shape of the physical contact of the touch on the touch screen corresponds to the mobile device;
      determining a first timestamp identifying when the mobile device was oriented in a predetermined orientation; and
      comparing the first timestamp identifying when the mobile device was oriented in the predetermined orientation with the second timestamp identifying when the touch was detected and determining that a first location of the mobile device while oriented in the predetermined orientation matches a second location of the second device when the touch was detected by the second device to determine that the touch detected by the touch screen of the second device coincided with the mobile device detecting the mobile device being oriented in the predetermined orientation.

11. The method of claim 10 further comprising the second device transmitting information about the touch to a server, wherein the server receives the information about the touch and determines that the touch coincided with the mobile device detecting the mobile device being oriented in the predetermined orientation.

12. The method of claim 10, wherein the second device receives information about the mobile device detecting the mobile device being oriented in the predetermined orientation and determines that the touch coincided with the mobile device detecting the mobile device being oriented in the predetermined orientation.

13. A system for pairing a mobile device with a second device, the system comprising:
   a mobile device comprising a first non-transitory computer readable medium storing instructions for a software application ("app"), wherein when executed, the app monitors an orientation of the mobile device, detects that the mobile device has been oriented in a predetermined orientation for a predetermined amount of time, and responsive to detecting that the mobile device has been oriented in the predetermined orientation for the predetermined amount of time transmits a first message indicating that the mobile device is in the predetermined orientation and provides an indication on the mobile device that indicates the mobile device has been oriented in the predetermined orientation for the predetermined amount of time and that indicates a pairing process is being performed, wherein the first message includes a first timestamp identifying when the mobile device was oriented in the predetermined orientation and includes a first location identifying where the mobile device was located when the mobile device was oriented in the predetermined orientation;
   a second device comprising a touch screen and a second non-transitory computer readable medium storing instructions that when executed cause the second device to monitor the touch screen, detect a touch with the touch screen, and transmit a second message indicating that the second device received a touch and identifying a size and a shape of the touch, wherein the second message includes a second timestamp identifying when the touch was detected by the second device and includes a second location identifying where the second device was when the touch was detected; and
   a server comprising a third non-transitory computer readable medium storing instructions that when executed cause the server to receive the first message and the second message, determine that the size and the shape of the touch detected by the touch screen corresponds to the mobile device, determine that the touch detected by the touch screen coincided with the mobile device being oriented in the predetermined orientation by comparing and matching the first timestamp with the second timestamp and comparing and matching the first location with the second location, and based on the touch coinciding with the mobile device being oriented in the predetermined orientation, authorize pairing of the mobile device with the second device.

14. The system of claim 13, wherein the predetermined orientation matches an orientation of the second device.

* * * * *